United States Patent
Dubois et al.

(10) Patent No.: US 10,456,885 B2
(45) Date of Patent: Oct. 29, 2019

(54) METHOD FOR PROVIDING A REFERENCING ELEMENT TO AN OPTICAL LENS MEMBER

(71) Applicant: Essilor International, Charenton-Le-Pont (FR)

(72) Inventors: Frederic Dubois, Charenton le Pont (FR); Sebastien Maurice, Charenton le Pont (FR)

(73) Assignee: Essilor International, Charenton-Le-Pont (FR)

( * ) Notice: Subject to any disclaimer, the term of this patent is extended or adjusted under 35 U.S.C. 154(b) by 99 days.

(21) Appl. No.: 14/771,071

(22) PCT Filed: Feb. 28, 2014

(86) PCT No.: PCT/EP2014/053924
§ 371 (c)(1),
(2) Date: Aug. 27, 2015

(87) PCT Pub. No.: WO2014/131878
PCT Pub. Date: Sep. 4, 2014

(65) Prior Publication Data
US 2016/0001414 A1    Jan. 7, 2016

(30) Foreign Application Priority Data
Mar. 1, 2013    (EP) .................................... 13305240

(51) Int. Cl.
*B24B 13/005* (2006.01)
*B29D 11/00* (2006.01)
(Continued)

(52) U.S. Cl.
CPC .... *B24B 13/0055* (2013.01); *B29D 11/00317* (2013.01); *B29D 11/00942* (2013.01); *G01M 11/025* (2013.01); *G02C 7/021* (2013.01)

(58) Field of Classification Search
CPC ......... B24B 13/0055; B29D 11/00317; G01M 11/0221
(Continued)

(56) References Cited

U.S. PATENT DOCUMENTS 1,958,275 A * 5/1934 McCabe ............ G01M 11/0207
356/127
2,290,566 A * 7/1942 Lockhart ............ G01M 11/0207
33/1 R
(Continued)

FOREIGN PATENT DOCUMENTS

EP    2 199 021    6/2010
FR    2 838 512    10/2003
(Continued)

*Primary Examiner* — Zachary W Wilkes
(74) *Attorney, Agent, or Firm* — Oblon, McClelland, Maier & Neustadt, L.L.P.

(57) ABSTRACT

Method for providing a referencing element to an optical lens member. An optical lens member is provided which has a first optical surface, with a surface design associated with a first reference system, and a second optical surface to be manufactured. The first and second optical surfaces are connected by an external periphery surface. The first optical surface of the optical lens member is measured, and the first reference system is determined. The reference system is determined according to the shape and orientation of the first optical surface. A referencing element is added to the optical lens member, with the referencing element identifying the first reference system.

9 Claims, 6 Drawing Sheets

(51) Int. Cl.
*G02C 7/02* (2006.01)
*G01M 11/02* (2006.01)

(58) Field of Classification Search
USPC .................................................. 351/159.8
See application file for complete search history.

(56) References Cited

U.S. PATENT DOCUMENTS

| | | | |
|---|---|---|---|
| 6,743,486 B1* | 6/2004 | Miyazawa | B24B 9/14 |
| | | | 351/159.69 |
| 6,953,381 B2* | 10/2005 | Siders | B24B 1/00 |
| | | | 451/384 |
| 7,267,436 B2* | 9/2007 | Ito | B23K 26/04 |
| | | | 219/121.68 |
| 7,980,920 B2* | 7/2011 | Akiyama | B24B 9/146 |
| | | | 451/10 |
| 2005/0046792 A1 | 3/2005 | Ito et al. | |
| 2011/0257930 A1* | 10/2011 | Gourraud | B24B 13/005 |
| | | | 702/150 |
| 2012/0225767 A1* | 9/2012 | Imholt | B29D 11/00 |
| | | | 501/1 |

FOREIGN PATENT DOCUMENTS

| | | |
|---|---|---|
| JP | 2012 194547 | 10/2012 |
| WO | WO 2007/001251 | 1/2007 |
| WO | WO 2008/110782 | 9/2008 |

\* cited by examiner

METHOD FOR PROVIDING A REFERENCING ELEMENT TO AN OPTICAL LENS MEMBER

RELATED APPLICATIONS

This is a U.S. national stage application under 35 USC § 371 of International Application No. PCT/EP2014/053924, filed on Feb. 28, 2014. This application claims the priority of European application no. 13305240.7 filed Mar. 1, 2013, the entire content of which is hereby incorporated by reference.

FIELD OF THE INVENTION

The present invention relates to a method for providing a referencing element to an optical lens member and a method of manufacturing an optical lens.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

An ophthalmic lens is typically made of plastic or glass material and generally has two opposing surfaces which co-operate to provide a required corrective prescription. When the positioning or shape of one of these surfaces with respect to the other is inaccurate, optical errors can occur.

Manufacturing of an ophthalmic lens to the required prescription requirements typically includes machining a face of a semi-finished lens. Typically, a semi-finished lens has a finished face, for example the front face and an unfinished face, for example the back face. By machining the back face of the lens to remove material, the required shape and positioning of the surface of the back face with respect to the surface of the front face for the desired corrective prescription can be generated.

Conventionally, the surface of the finished face of the semi-finished lens is obtained by molding.

The surface of the finished face is provided with engraved markings on the finished face. The engraved markings define a reference system of the surface of the finished face of the semi-finished lens.

The finished face of the semi-finished lens and the engraved markings are obtained by injecting an optical material in a specific mold.

The internal surface of the specific mold is arranged so as to provide the finished face of the semi-finished lens and the corresponding markings.

Since the corresponding markings are used as reference markings during the manufacturing of the optical lens, the position of such markings is required to be very accurate, thus increasing the price of the molds and of the overall process.

Furthermore, during the molding process, the lens member material is injected in the mold after having been heated and is cooled to solidify in the mold. During the cooling step, the material may deform creating an uncertainty on the positions of the reference markings.

SUMMARY OF THE INVENTION

One object of the present invention is to provide a method of providing an optical lens member that does not present the mentioned drawbacks, in particular that provides the reference markings in a cheaper and more accurate matter than the prior art methods.

In accordance with a first aspect of the invention, there is provided a method for providing a referencing element to an optical lens member. The method comprises:

an optical lens member providing step, during which an optical lens member is provided, the optical lens member comprising a first optical surface comprising a surface design associated with a first reference system and a second optical surface to be manufactured, the first and second optical surfaces are connected by an external periphery surface, a measuring step during which the first optical surface of the optical lens member is measured and the first reference system is determined, wherein the reference system is determined according to the shape and orientation of the first optical surface, a referencing step during which a referencing element is added to the optical lens member, wherein the referencing element identifies the first reference system.

Advantageously, the optical lens member provided during the optical lens member providing step can be obtained by any known method, in particular by molding without having to provide reference markings with the mold.

The method according to the invention allows providing a semi-finished optical lens having a first optical surface comprising a surface design associated with a first reference system and a referencing element that identifies said first reference system. Advantageously, the method according to an embodiment of the invention may be carried out using optical lens members that have been obtained by using molds free of reference systems.

Therefore, the method according to the invention allows providing cheaper and more accurate semi-finished optical lens members than the prior art methods.

According to further embodiments which can be considered alone or in combination:

the referencing element is added at least partly on the first optical surface of the optical lens member; and/or the shape and orientation of the first optical surface are obtained by measuring the first optical surface; and/or the referencing element is added at least partly on the second optical surface of the optical lens member; and/or the referencing element comprises temporary markings; and/or the referencing element comprises markings realized by engraving and/or additive manufacturing; and/or the referencing element comprises at least a sub-surface element located between the first and second optical surfaces; and/or the sub-surface referencing element comprises a plurality of sub-surface markings, the sub-surface markings defining a plane; and/or the referencing element comprises sets of coplanar sub-surface markings each set of markings defining a different plane; and/or the referencing element is arranged so that when an optical lens is manufactured from said optical lens member, said referencing element remains at least partially on the optical lens without causing any discomfort to the wearer of the optical lens; and/or the first optical surface of the optical lens member is obtained by molding; and/or the first optical surface of the optical lens member is obtained by machining; and/or the first optical surface of the optical lens member is obtained by additive manufacturing.

Another aspect of the invention relates to a method of manufacturing an optical lens, the method comprising:
- the steps of the method according to the invention,
- a surface data providing step during which surface data corresponding to the second optical surface of the optical lens to be manufactured is provided,
- a blocker providing step, during which a blocker with a blocker reference system is provided,
- an optical lens member positioning step during which the first face of the optical lens member is placed on the blocker and positioned in a blocking position with respect to the blocker reference system using the referencing element,
- a blocking step during which the optical lens member is blocked on the blocker in the blocking position,
- a manufacturing step during which the second surface of the optical lens member is manufactured according to the surface data.

According to further embodiments which can be considered alone or in combination:
- the method further comprises a blocking position determining step during which the blocking position of the optical lens member is determined with respect to the blocker reference system using the referencing element; and/or
- the position and/or orientation of the referencing element is measured by lighting the optical lens member through the external periphery surface and capturing an image of the lighted referencing element; and/or
- the referencing element is visualized through the second face of the lens member and the refractive properties of the lens member are taken into account when determining the position and/or orientation of the referencing element.

Another aspect of the invention relates to a method of adapting surface data of a surface of an optical lens member to be manufactured, the method comprising:
- a blocked optical lens member providing step during which a optical lens member obtained by a method according to the invention blocked on an insert having an insert reference system is provided,
- a blocking position determining step during which the blocking position of the optical lens member is determined with respect to the insert reference system using the referencing element,
- a surface data providing step during which surface data corresponding to the second optical surface to be manufactured on the second face of the optical lens member are provided, said surface data being expressed with respect to the insert reference system;
- a surface data adapting step, during which the surface data is adapted according to the blocking position of the optical lens member.

The surface data may be used for the machining of a face of the optical lens member and/or for the referencing of the machined face of the optical lens member and/or for the polishing of the machined face of the optical lens member and/or for the marking of the machined face of the optical lens member and/or for the coating of the machined face of the optical lens member.

Another aspect of the invention relates to a method of manufacturing an optical lens, the method comprising:
- the steps of the method according to an embodiment of the invention,
- a surface data providing step during which surface data corresponding to the second optical surface to be manufactured on the second face of the optical lens member are provided, said surface data being expressed with respect to the insert reference system;
- a manufacturing step during which the second optical surface of the optical lens member is manufactured according to the surface data.

According to a further aspect, the invention relates to a computer program product comprising one or more stored sequences of instructions that are accessible to a processor and which, when executed by the processor, causes the processor to carry out the steps of the method according to an embodiment of the invention.

Another aspect of the invention relates to a computer readable medium carrying one or more sequences of instructions of the computer program product according to an embodiment of the invention.

Another aspect of the invention relates to a program which makes a computer execute the method according to an embodiment of the invention.

Another aspect of the invention relates to a computer-readable storage medium having a program recorded thereon; where the program makes the computer execute the method according to embodiment of the invention.

Another aspect of the invention relates to a device comprising a processor adapted to store one or more sequence of instructions and to carry out at least one of the steps of the method according to an embodiment of the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF THE DRAWINGS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the sense of the invention, the "surface design" designates the set of parameters that allow defining the surface of a face of an optical lens member. For example the surface design may comprise the surface equation, position and orientation of the surface of a face of an optical lens member, such equation, position and orientation being defined in a reference system.

In the context of the present invention the term "optical lens member" can refer to a lens blank or a semi-finished lens.

Figure 1:
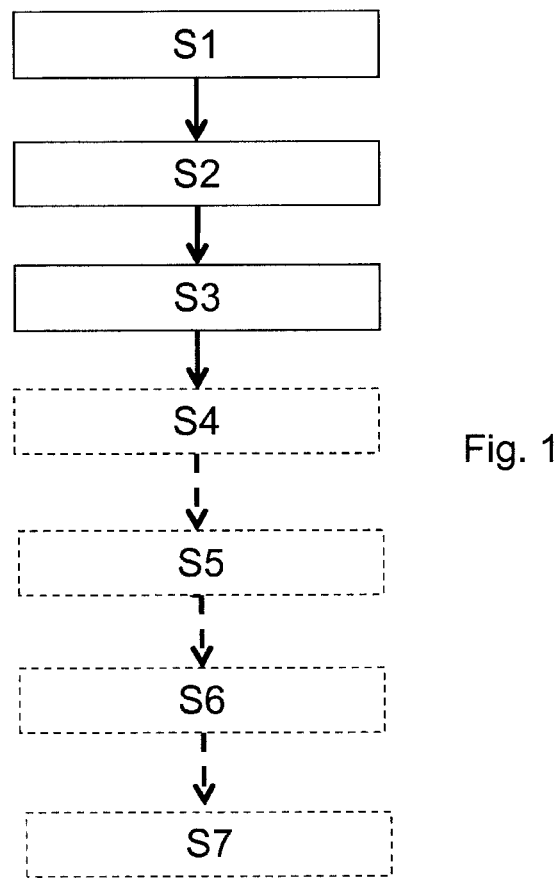
FIG. 1 is a flowchart of the steps of a method according to an embodiment of the invention.

According to an embodiment of the invention represented on FIG. 1, the method of the invention comprises:
an optical lens member providing step S1,
a measuring step S2,
a referencing step S3.

Figure 3A:
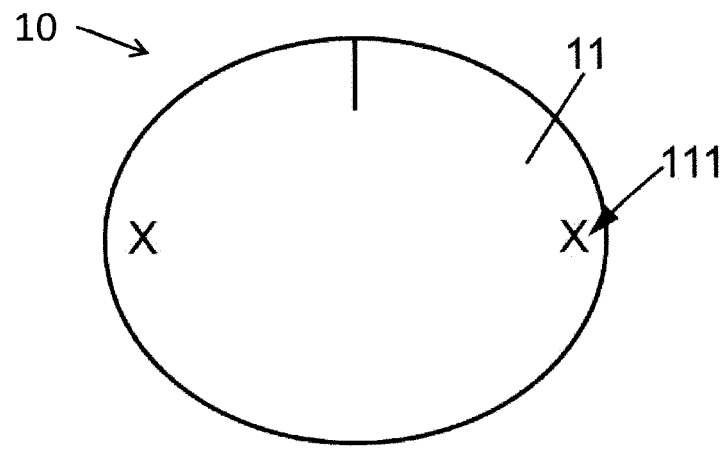
FIG. 3A is a side view of an optical lens member with a referencing element according to a further embodiment of the invention.
Figure 3B:
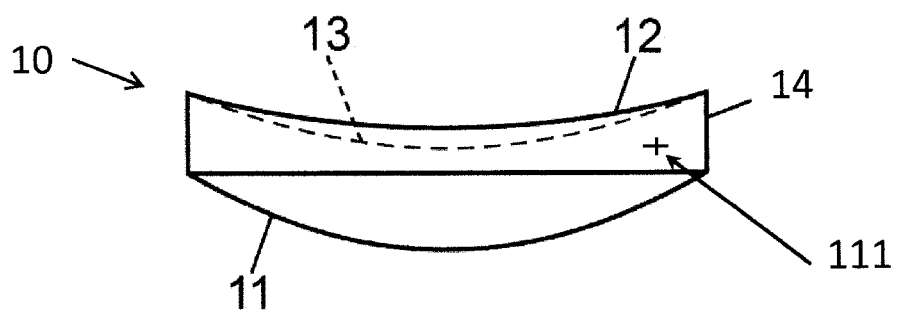
FIG. 3B is a front view of an optical lens member with a referencing element according to a further embodiment of the invention.

An optical lens member, as represented on FIG. 3B, is provided during the optical lens member providing step S1.

The optical lens member 10 has a first optical face 11 and a second optical face 12. The first and second optical faces are connected by an external periphery surface 14. The first optical face 11 comprises a surface design associated with a first reference system.

In the example represented on FIG. 3B, the first optical face 11 corresponds to the front face of the optical lens member. In use of the resulting finished optical lens, the front face 11 is disposed nearest the object being viewed.

The second face 12 is to be modified by a manufacturing method so as to provide for example the back face 13 of the finished optical lens, represented by the dotted line. Second face 12 is to be machined by a machining tool so that the back face 13 is orientated with respect to the first reference system.

The optical lens member 10 may be obtained by molding or machining or additive manufacturing. Whatever method is used to obtain the optical lens member 10, the optical lens member does not require referencing elements.

During the measuring step S2, the first optical surface 11 is measured and the first reference system is determined according to the measured shape and orientation of the first optical surface 11.

The measurements of the first optical surface 11 can be carried out by any means known of the skilled person, for example using a mechanical sensor or an optical measurement.

The reference system is determined according to the shape and orientation of the first optical surface 11.

During the referencing step S3, at least a reference element is added to the optical lens. The referencing element identifies the first reference system.

In the sense of the invention, the wording "element identifies the first reference system" may be understood as meaning that a skilled person can easily identify the main center and the mains axis of the reference system from the position and orientation of the sub-surface referencing element.

According to a further embodiment, the referencing system may be a reference to information stored in a data base. The operator may access to the data base and from the information comprised in the database identify the main center and the mains axis of the reference system.

Figure 2:
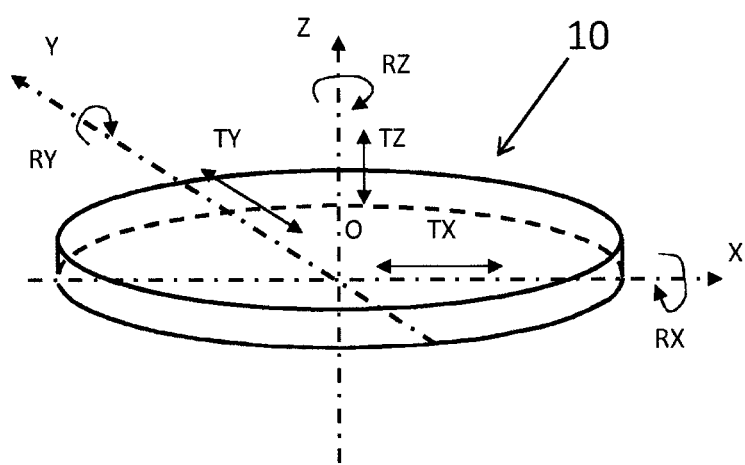
FIG. 2 is a perspective view of a preformed surface of an optical lens member illustrating a reference system and the position parameters.

As represented on FIG. 2, the reference system comprising a main axis Z perpendicular to a main plane (X, Y) defined by two axes X, Y perpendicular to each other and to the main axis Z. The position of the lens member, in particular of each optical surface of the lens member 10 in such reference system is defined by six parameters. Among the six parameters, three are translation parameters TX, TY and TZ along each axis X, Y, and Z and three are rotation parameters RX, RY, and RZ about each of the axis X, Y, and Z.

As represented on FIG. 3A, the referencing element can comprises markings 111 provided on either the front or the back surface or shared between the front and back surface of the optical lens member.

On FIG. 3A, the reference markings 111 are provided on the first surface 11 of lens member 10. According to an embodiment of the invention, the markings 111 may be engraved markings having a depth of a few micrometers so as to limit the risk of disturbing the wearer of the resulting finished optical lens.

According to an alternative embodiment of the invention, the markings 111 may be temporary markings that may be remove before providing the manufactured optical lens to the wearer.

The reference markings may be realized by engraving and/or additive manufacturing.

As represented on FIG. 3B, the reference element may comprise at least a sub-surface element located between the first and second optical surfaces.

While in these embodiments of the invention, the first face is the front face of the lens member and the second face is the back face, it will be understood, that in alternative embodiments of the invention the first face may be the back face of the lens member and the second face may be the front face.

Furthermore, while in this embodiment of the invention, the back face of the optical lens is formed by a digital surfacing manufacturing method, it will be understood, that in alternative embodiments of the invention both or either faces of the lens may be formed by a manufacturing method.

Moreover, although the face 12 to be manufactured is represented in FIG. 3B as concave, it will be appreciated that this surface 13 could equally well be convex or any other curved surface.

According to an embodiment of the invention, the first face has a surface design associated with the reference system. In other words, the surface design of the first optical face of the optical lens member is oriented and positioned with respect to the reference system identified by the referencing element 111.

The referencing element 111 is configured to remain at least partially in the manufactured optical lens after the second optical face has been manufactured and eventually after the optical lens has been edged so as to fit a spectacle frame. Therefore, preferably the referencing element is configured so as not to cause any discomfort to the wearer of the optical lens. For example, the referencing element is placed out of the wearer's principal visual field.

Alternatively, referencing elements 111 are configured to vanish from the manufactured optical lens after the second optical face has been manufactured and eventually after the optical lens has been edged so as to fit a spectacle frame. In this embodiment the visibility of the referencing element can be much higher than in the previously described embodiment.

According to an embodiment of the invention, the referencing element is arranged so as to be visible only under specific lighting conditions.

The referencing element 111 may comprise local modification of the refractive index of the optical lens member. For example the referencing element comprises a set of markings. Each marking may have a dimension of a few microns, for example between 1 and 5 μm and each marking is distant of about 10 to 20 μm from the others.

Advantageously the markings are so small that they do not cause any discomfort to the wearer of the optical lens and but its size is sufficient for creating a light scattering point in specific lighting conditions. The markings composing the set are close enough to allow identifying a shape, for example an elementary geometrical shape such as a square, a circle, a triangle, etc. . . .

Such micro-markings may be obtained by using a pulsed laser source with pulse duration within femto-second range. The light emitted by the laser source is focused within the optical lens member.

As a non-limiting example, the inventors have obtained good results using an Amplitude Systemes S-Pulse laser source. The light emitted by this light source is focused within the optical lens member using a Mitutoyo objective. The laser light used had a wavelength of about 1030 nm, a pulse duration of about 650 fs, an average power of about 1 W for a recurrency of 10 kHz and the objective is a microscope objective 20× having an numerical aperture of about 0.4 and was placed at about 10 mm of the focusing point. Using such parameters the inventors have obtained good sub-surface markings about 1 mm below the laser side surface of the lens member. According to an embodiment, the referencing element may comprise a plurality of sub-surface markings. The sub-surface markings may define a plane P1, preferably the plane P1 is perpendicular to the main axis (Z) of the reference system.

Furthermore, the sub-surface markings may be arranged to form, when highlighted, a specific shape, for example a circle or a square, preferably such shapes are in the plane P1 perpendicular to the main axis (Z). Advantageously, when visualizing the referencing element trough one of the optical surfaces, a deformation of the shape defined by the sub-surface markings can easily be linked to a tilt in the position of the optical lens member about the two axes X and Y.

Figure 4:
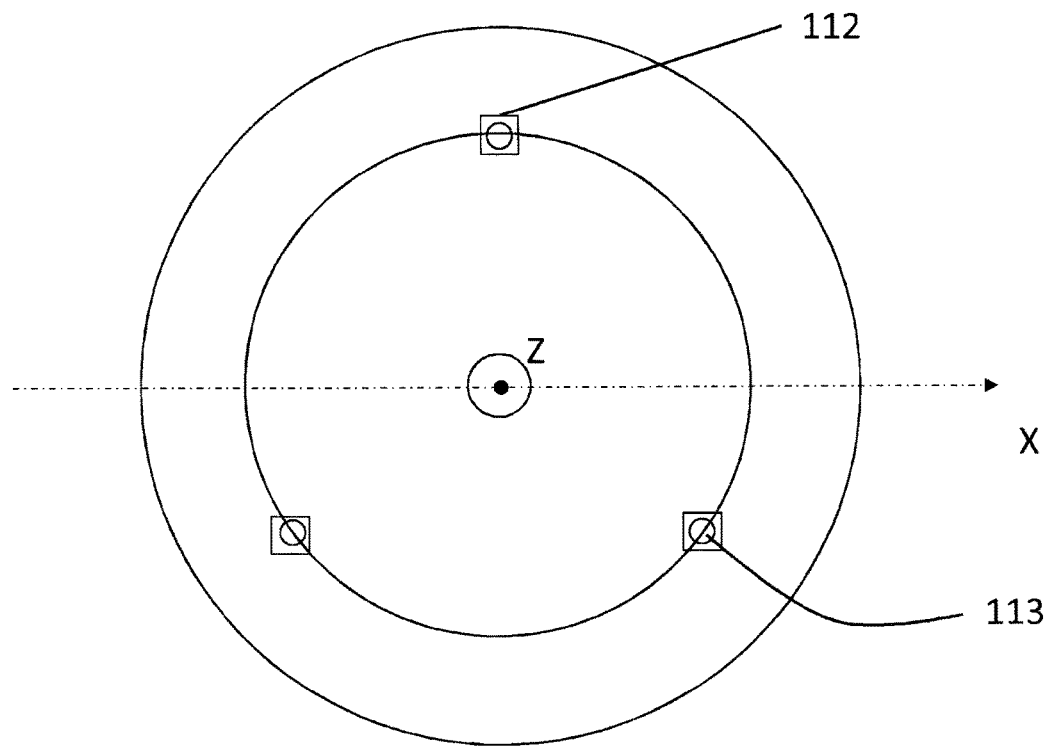
FIG. 4 is a front view of an optical lens member according to an embodiment of the invention.
Figure 5:
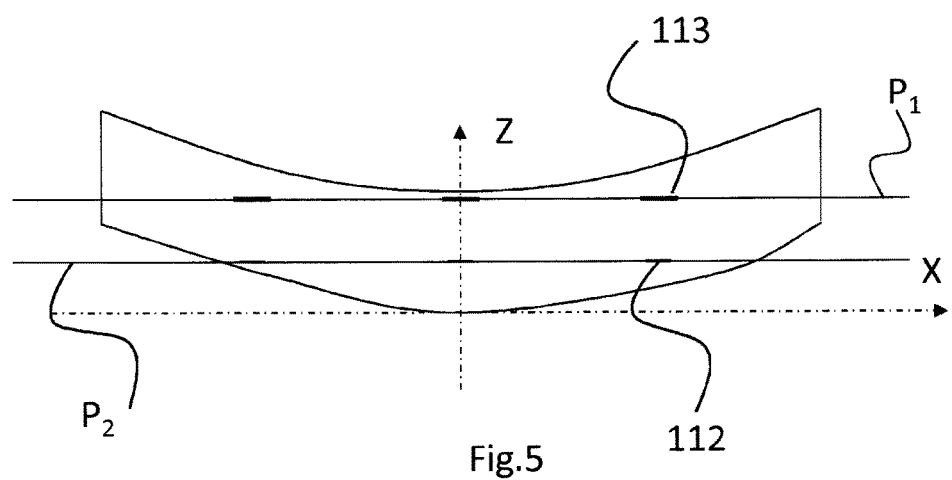
FIG. 5 is a cross-section view of the optical lens member of FIG. 4.

According to an embodiment of the invention illustrated on FIGS. 4 and 5, the referencing element may comprise a first set of sub-surface markings 112, represented as squares in FIG. 4, and a second set of sub-surface markings 113 represented as circles in FIG. 4. Each set of sub-surface markings defining a plane P1 and P2. The plane P1 and P2 being different one from the other, preferably parallel one to the other and perpendicular to a specific point of the first face of the optical lens.

According to an embodiment of the invention, the set of markings are determined according to optical data and observation data.

The optical data represent the refractive properties of the optical lens member.

The optical data may represent the design of the first and second surfaces, the position of the second relative to the first surface, for example, the thickness and prism of the optical lens and the refractive index. For example, the optical data represent the prescription of the wearer.

The observation data represent observation conditions in which the first and second set of sub-surface markings are to be observed. The observation conditions may be defined by considering the observation device and the position of the manufactured lens in the observation device. The position of the manufactured optical lens in the observation device may be defined as the position of an optical lens reference system and an observation device reference system.

Advantageously, determining the relative positions of the two set of markings is rendered much easier, in particular when the observation of the first and second set of markings is realized in the observation conditions.

According to an embodiment of the invention, the sub-surface markings are arranged so as to appear at the same position in the observation conditions when the optical lens member is correctly positioned in the reference system. Therefore, in the observation condition the second and first markings appear superimposed. This simplifies the lens positioning operations prior to the blocking step.

Figure 6A:
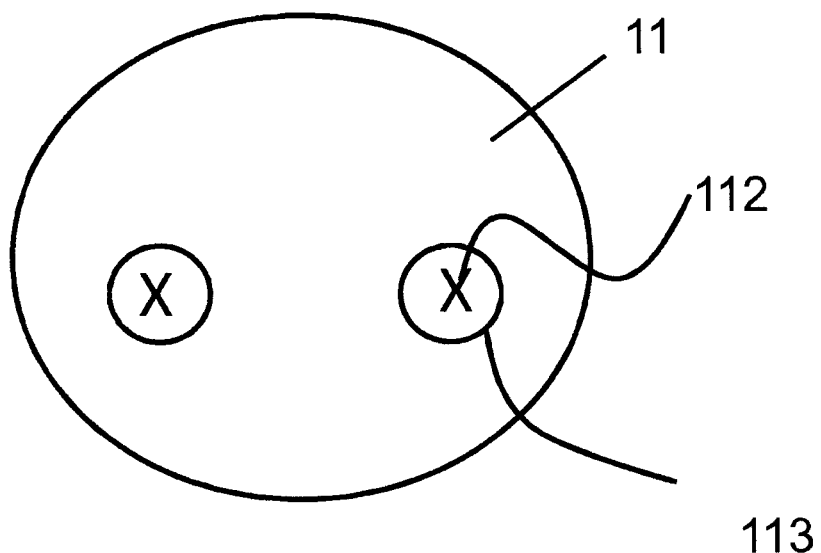
FIGS. 6A to 6C are schematic representation of optical lenses according to an embodiment of the invention.
Figure 6B:
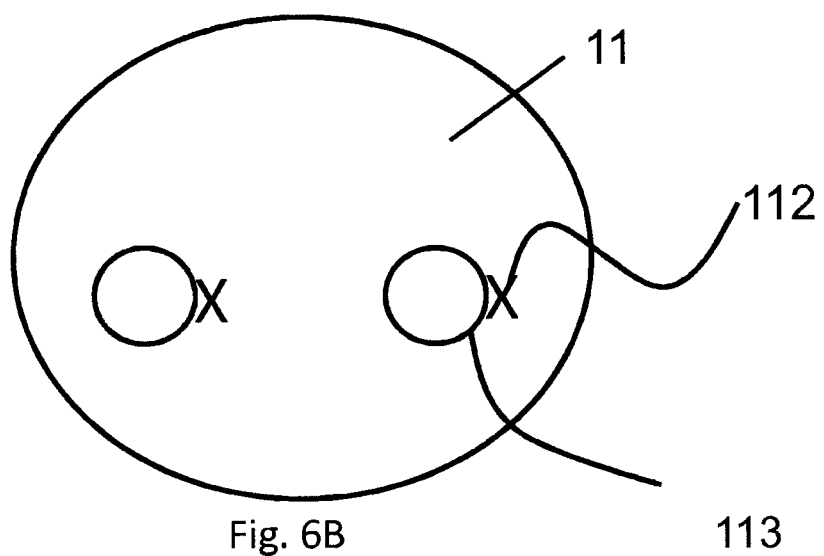
Figure 6C:
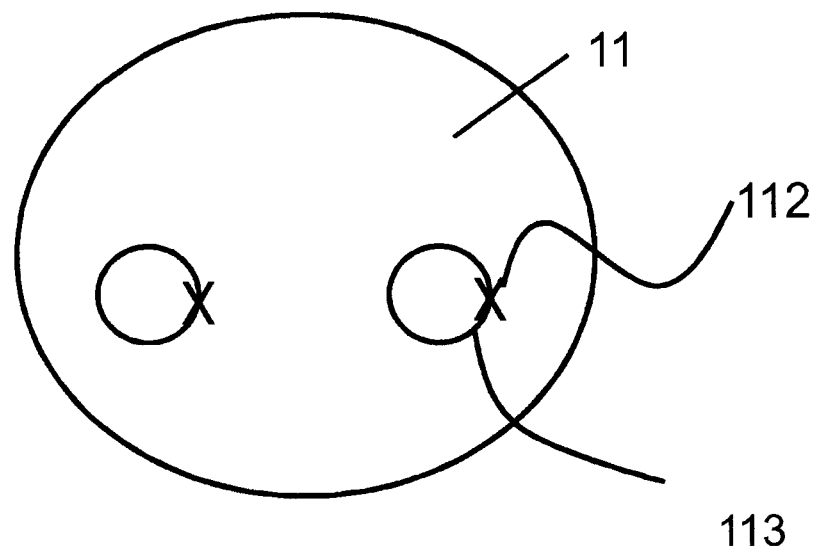

According to an embodiment of the invention illustrated on FIG. 6A to 6C, the sets of sub-surface markings may be determined so as to take into account a positioning error tolerance.

For example as illustrated on FIG. 6A, the second markings 113 may have circular shapes and be determined so as to appear centered over the first markings 112 in the observing conditions when the optical lens member is correctly positioned in the reference system. The radius of the circular shaped second markings may be determined based on an error position tolerance.

Therefore, when the positioning error of the optical lens member is greater than the error position tolerance, the first markings appear outside the second markings, as illustrated on FIG. 6B.

However, when the positioning error of the optical lens member is smaller than the error position tolerance, the first markings appear inside the second markings, as illustrated on FIG. 6C.

The invention further relates to a method of blocking an optical lens member. The method comprises:

an optical lens member providing step S1, a measuring step S2, and a referencing step S3 as previously discussed;

a taping step S4;

a blocker providing step S5;

an optical lens member positioning step S6;

a blocking step S7.

During the taping step S4, an adhesive tape is provided on the first face of the lens member so as to cover at least part of the first face.

Examples of suitable adhesive tapes are given in U.S. Pat. No. 6,036,013.

During the blocker providing step S5 a blocker with a blocker reference system is provided.

The optical lens is placed on the blocker and positioned in a blocking position with respect to the blocker reference system using the sub-surface reference elements during the optical lens member positioning step S6.

During the blocking step S7, the optical lens member is blocked on the blocker in a blocking position. The blocking position is determined with respect to the blocker reference system using the sub-surface referencing element.

Figure 7:
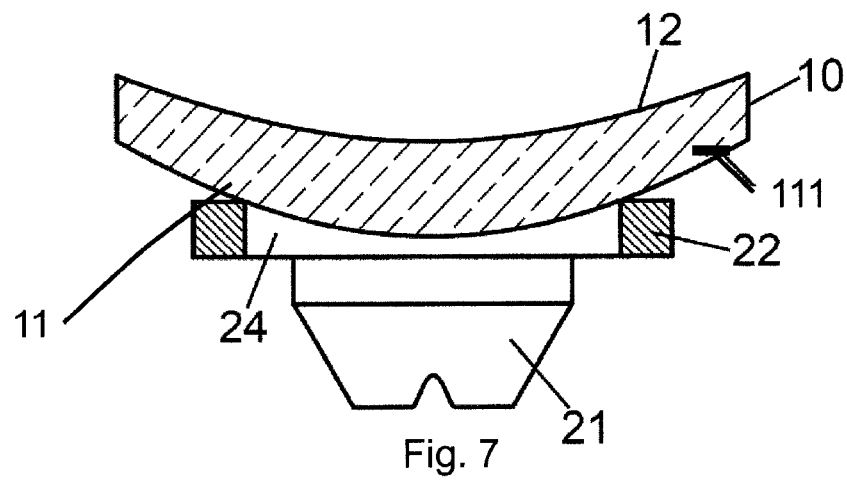
FIG. 7 is a cross-section view of an optical lens member having a surface placed on a blocking ring.

Referring now to FIG. 7, a lens blocking device for blocking optical lens member 10 in the correct position for manufacturing processes may comprise an insert 21 and a blocking ring 22. Blocking cast material 24 is poured into the cavity defined by the lower surface of the optical lens member 10, the insert 21 and the blocking ring 22. The blocking cast material 24 cools to solidify in order to provide a blocker for the lens member 10 at the desired positioning for machining.

Figure 8:
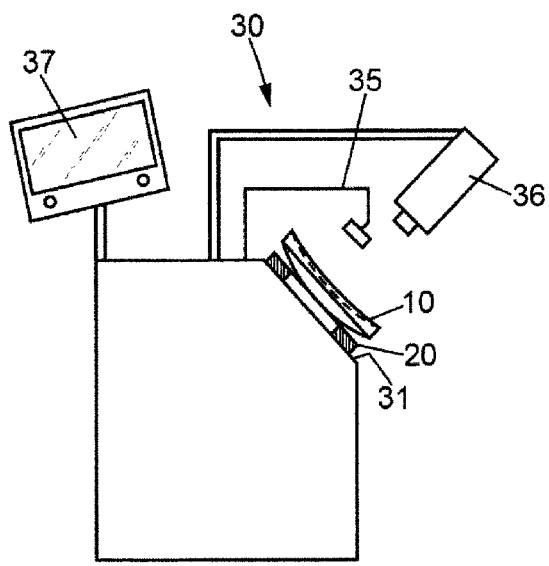
FIG. 8 is schematic view of an optical lens member on a blocking station.

As illustrated in FIG. 8, a lens blocking device 20 is part of a blocking station 30. Blocking station 30 comprises the blocking device 20 disposed on a top plate 31 of the blocking station 30 and a clamping arm 35 which may be moved from a free position to a clamping position in which it holds the optical lens member 10 in place on the blocking device 20. Blocking station 30 also includes a digital camera 36 for taking an image of the positioning of the lens member 10 on the blocking device 20, and a screen 37 for viewing the image from the digital camera 36. The lens member 10 may also be directly viewed by an operator without using the digital camera 36.

Figure 9:
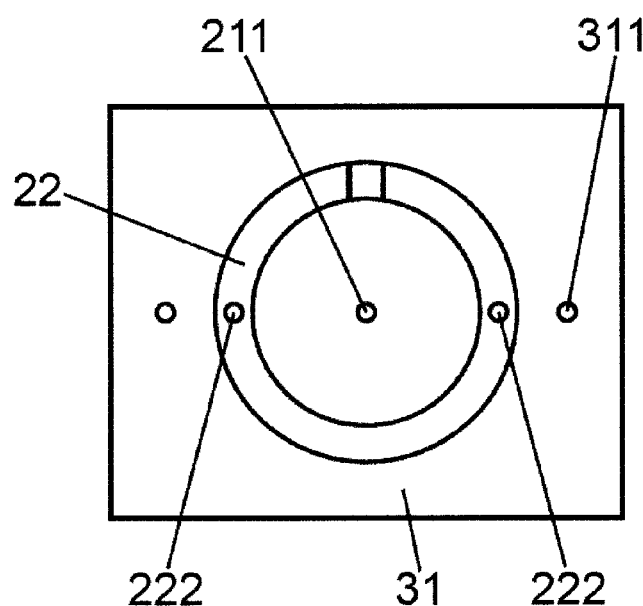
FIG. 9 is a planar top view of the contact surface of the blocking device and blocking plate of the blocking station of FIG. 8.

As illustrated on FIG. 9, the blocking device 20 is provided with blocker reference markings including alignment markings 222 provided on the blocking ring 22 and a central marking 211. In the case where an insert is provided in the center of the blocking ring, the central marking 211 may be provided on the insert. The top plate 31 of the blocking station 30 is devoted to receive a blocking ring 22 on the top plate 31. Alignment markings 222 on the ring may include a hole for receiving corresponding positioning projections on the top plate 31 allowing the ring 22 to be correctly positioned on the blocking plate 31. The alignment markings 222 may be further provided with a line marking following a reference axis to aid alignment.

After the optical lens member 10 has been placed on the blocking device 20, the operator may make an initial judgment as to the quality of the positioning by direct visualization of the reference element 111 of the optical lens member 10 with respect to the reference markings of the blocking device 20 before continuing the blocking process. If the operator is not satisfied with the initial positioning, the optical lens member 10 may be repositioned manually or automatically on the blocking device 20. Once the operator is satisfied with the positioning, the clamping arm 35 may be put in place to hold the optical lens member 10 in position on the blocking device 20.

The positioning of the optical lens member 10 on the blocking device 20 can then be quantified using the digital camera 36. In order to measure the positioning of the lens member 10, the referencing elements 111 and the reference markings 211 and 222 provided on the blocking device 20 are viewed through the lens member 10 by means of the camera 36 of the blocking device 20 as illustrated in FIG. 8.

The position and/or orientation of the referencing element may be measured by lighting the optical lens member through the external periphery surface and capturing an image of the lighted referencing element, for example using the camera 36.

According to an embodiment of the invention, the deviation of the image of the referencing element 111 located between the first and second faces of the lens member 10 due to refractive properties of the optical lens member 10 may be taken into account when making measurements of the position of the reference system relative to the blocker reference system.

These various steps can alternatively be performed automatically by machines rather by an operator.

Further to the blocking step, the method according to the invention may comprise a blocking position determining step S8.

During the blocking position determining step S8, the blocking position of the optical lens member is determined with respect to the blocker reference system using the referencing element 111. Determining the actual blocking position may be used during the downstream steps of the manufacturing process of the optical lens.

For example the surface data use to manufacture the surface of the second face of the optical lens may be adapted according to the actual blocking position of the optical lens member.

Indeed, usually, the surface data are determined assuming that the optical lens member is perfectly positioned with respect to the blocker reference system. However a positioning error may occur during the blocking process. Advantageously, the method according to the invention allows determining the actual position of the optical lens member and the surface data can be adapted according to the difference between the actual position and the theoretical position of the optical lens member. The determination of the actual position is easy because it is based on a relative position measurement of shapes appearing on an image captured, through the lens member. Thus, the method according to the invention allows increasing the overall accuracy of the manufacturing process and the optical quality of the manufactured optical lenses.

The invention further relates to a method of manufacturing an optical lens. The method further comprises after the steps of the blocking method according to the invention:

a surface data providing step during which surface data corresponding to the second optical surface to be manufactured on the second face of the optical lens member are provided, a manufacturing step during which the second optical surface of the optical lens member is manufactured according to the surface data.

As indicated previously, the surface data may have been adjusted based on the actual position of the optical lens, said actual position being determined using the sub-surface referencing element.

According to an aspect of the invention, both faces of the optical lens member may be manufactured, for example by digital surfacing technology. Thus the invention further relates to a method of manufacturing an optical lens comprising:
- a first optical surface manufacturing step during which the second optical face of the optical lens member is manufactured according to the invention, from a first optical lens blank; and
- a second optical surface manufacturing step during which the first optical face of said optical lens member is manufactured according to the invention.

During the first and second optical surface manufacturing steps, the same reference system identified by the sub-surface referencing element is used. Advantageously, the risk of shift between the surfaces of the first and second faces of the final ophthalmic lens is reduced. Thus, the overall quality of the manufacturing process can be increased.

While the foregoing examples have been described with reference to the manufacture of an ophthalmic lens, it will be appreciated that the method of the invention may be applied more generally to the manufacture of other types of optical lens, for example optical lens used in telescopes and the like.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for providing a referencing element to an optical lens member, the method comprising:
   - measuring a first optical surface of an optical lens member, the optical lens member comprising the first optical surface comprising a surface design associated with a first reference system including translational and rotational parameters and a second optical surface to be manufactured, the first and second optical surfaces being connected by an external periphery surface,
   - determining the first reference system, wherein the first reference system is determined according to the shape and orientation of the first optical surface, wherein the first reference system is unique to the first optical surface; and
   - adding a referencing element to the optical lens member, wherein the referencing element identifies the first reference system, the referencing element comprising at least a sub-surface element located between the first and second optical surfaces.

2. The method according to claim 1, wherein the sub-surface referencing element comprises a plurality of sub-surface markings, the sub-surface markings defining a plane.

3. The method according to claim 1, wherein the referencing element comprises sets of coplanar sub-surface markings, each set of markings defining a different plane.

4. The method according to claim 1, further comprising:
   - arranging the referencing element so that when an optical lens is manufactured from said optical lens member, said referencing element being placed on the optical lens out of the wearer's principal visual field.

5. The method according to claim 1, further comprising:
   - molding the first optical surface of the optical lens member.

6. The method according to claim 1, further comprising:
   - machining the first optical surface of the optical lens member.

7. The method according to claim 1, further comprising:
   - additive manufacturing the first optical surface of the optical lens member.

8. A method of manufacturing an optical lens, the method comprising:
   - measuring a first optical surface of an optical lens member, the optical lens member comprising the first optical surface comprising a surface design associated with a first reference system including translational and rotational parameters and a second optical surface to be manufactured, the first and second optical surfaces being connected by an external periphery surface;
   - determining the first reference system, wherein the first reference system is determined according to the shape and orientation of the first optical surface, wherein the first reference system is unique to the first optical surface;
   - adding a referencing element to the optical lens member, wherein the referencing element identifies the first reference system, the referencing element comprising at least a sub-surface element located between the first and second optical surfaces;
   - positioning an optical lens member, so that the first face of the optical lens member is placed on a blocker associated with a blocker reference system and positioned in a blocking position with respect to the blocker reference system using the referencing element;
   - blocking the optical lens member on the blocker in the blocking position; and
   - manufacturing the second surface of the optical lens member according to surface data corresponding to the second optical surface of the optical lens to be manufactured.

9. A non-transitory computer readable medium carrying one or more sequences of instructions of a computer program which, when executed by a processor, causes the processor to perform a method, the method comprising:
   - controlling a sensor for measuring a first optical surface of an optical lens member, the optical lens member comprising the first optical surface comprising a surface design associated with a first reference system including translational and rotational parameters and a second optical surface to be manufactured, the first and second optical surfaces being connected by an external periphery surface,
   - determining the first reference system, wherein the first reference system is determined according to the shape and orientation of the first optical surface, wherein the first reference system is unique to the first optical surface, and
   - adding a referencing element to the optical lens member, the referencing element identifying the first reference system, the referencing element comprising at least a sub-surface element located between the first and second optical surfaces.

* * * * *